US 7,299,403 B1

United States Patent
Cleasby et al.

(12) United States Patent
Cleasby et al.

(10) Patent No.: US 7,299,403 B1
(45) Date of Patent: Nov. 20, 2007

(54) METHODS AND APPARATUS FOR OBTAINING A STATE OF A BROWSER

(75) Inventors: Andrew R. Cleasby, Marblehead, MA (US); Charles D. Cummings, Lowell, MA (US); Dana Russell, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 09/685,716

(22) Filed: Oct. 11, 2000

(51) Int. Cl.
*G06F 15/00* (2006.01)
(52) U.S. Cl. .................. 715/500; 715/738; 715/745
(58) Field of Classification Search ............... 715/500, 715/500.1, 501.1, 513, 738, 745
See application file for complete search history.

(56) References Cited

U.S. PATENT DOCUMENTS

| | | | |
|---|---|---|---|
| 5,774,670 A * | 6/1998 | Montulli ................... 709/227 |
| 5,861,883 A | 1/1999 | Cuomo et al. ............. 345/326 |
| 5,862,330 A | 1/1999 | Anupam et al. ........ 395/200.34 |
| 5,941,957 A | 8/1999 | Ingrassia, Jr. et al. ...... 709/248 |
| 5,951,652 A * | 9/1999 | Ingrassia et al. ............ 709/248 |
| 5,954,798 A * | 9/1999 | Shelton et al. ............. 709/224 |
| 5,987,376 A | 11/1999 | Olson et al. ............... 701/201 |
| 6,035,332 A * | 3/2000 | Ingrassia et al. ............ 709/224 |
| 6,070,185 A | 5/2000 | Anupam et al. ............ 709/204 |

(Continued)

OTHER PUBLICATIONS

Edwards et al., "Timewarp Techniques for Autonomous Collaboration", Proceedings of th SIGHI conference on Human Factors in Computing Systems, Mar. 1997, pp. 218-225.*

(Continued)

*Primary Examiner*—William Bashore
*Assistant Examiner*—Amelia Rutledge
(74) *Attorney, Agent, or Firm*—Chapin IP Law, LLC; Barry W. Chapin, Esq.

(57) ABSTRACT

Mechanisms and techniques provide the system that allows the server computer system to capture the complete state of the browser process performing on a client computer system in a remote manner. The capture of such state information by a server computer system is useful, for example, to allow participants to a shared collaborative communications session to join such a session prior to initiation of such a session, or at any point in time during the lifetime of the collaboration session. In operation, the system of the invention can be initiated by browser process performing to the client computer system which obtains the capture process, for instance, as an applet. The capture process can extract from the browser process state information associated with the browser containing document contained within the browser. The capture process can store such state information in a content object on the client computer system and can format and transmit the content object from the capture process on the client computer system to a server computer system in order to maintain a state of the browser in the server computer system. By capturing the state of the browser on the client computer system via the capture process on the client computer system, the complete image of the state information of the browser, including any user supplied information, can be obtained and returns to the server computer system, thus allowing the server computer system, for example, to have participants to a collaboration session join the collaboration session prior to its existence or at any point during the lifetime of the collaboration session without having to navigate through the entire collaboration session.

31 Claims, 7 Drawing Sheets

U.S. PATENT DOCUMENTS

| | | | | |
|---|---|---|---|---|
| 6,078,948 | A | 6/2000 | Podgorny et al. | 709/204 |
| 6,105,055 | A | 8/2000 | Pizano et al. | 709/204 |
| 6,112,240 | A * | 8/2000 | Pogue et al. | 709/224 |
| 6,144,991 | A | 11/2000 | England | 709/205 |
| 6,161,137 | A | 12/2000 | Ogdon et al. | 709/224 |
| 6,161,149 | A | 12/2000 | Achacoso et al. | 710/4 |
| 6,178,439 | B1 | 1/2001 | Feit | 709/200 |
| 6,185,602 | B1 | 2/2001 | Bayrakeri | 709/204 |
| 6,192,394 | B1 | 2/2001 | Gutfreund et al. | 709/204 |
| 6,230,171 | B1 * | 5/2001 | Pacifici et al. | 715/512 |
| 6,230,185 | B1 | 5/2001 | Salas et al. | 709/205 |
| 6,237,025 | B1 | 5/2001 | Ludwig et al. | 709/204 |
| 6,240,444 | B1 | 5/2001 | Fin et al. | 709/205 |
| 6,256,389 | B1 | 7/2001 | Dalrymple et al. | 379/900 |
| 6,259,701 | B1 | 7/2001 | Shur et al. | 370/401 |
| 6,279,001 | B1 | 8/2001 | DeBettencourt et al. | 707/10 |
| 6,295,550 | B1 | 9/2001 | Choung et al. | 709/204 |
| 6,295,551 | B1 | 9/2001 | Roberts et al. | 709/205 |
| 6,297,819 | B1 | 10/2001 | Furst | 345/329 |
| 6,298,356 | B1 | 10/2001 | Jawahar et al. | 707/201 |
| 6,308,188 | B1 | 10/2001 | Bernardo et al. | 707/530 |
| 6,310,941 | B1 | 10/2001 | Crutcher et al. | 379/88.17 |
| 6,314,463 | B1 | 11/2001 | Abbott et al. | 709/224 |
| 6,317,777 | B1 | 11/2001 | Skarbo et al. | 709/204 |
| 6,317,786 | B1 | 11/2001 | Yamane et al. | 709/224 |
| 6,330,566 | B1 | 12/2001 | Durham | 707/104 |
| 6,334,141 | B1 | 12/2001 | Varma et al. | 709/205 |
| 6,338,086 | B1 | 1/2002 | Curtis et al. | 709/218 |
| 6,353,851 | B1 * | 3/2002 | Anupam et al. | 709/204 |
| 6,360,250 | B1 * | 3/2002 | Anupam et al. | 709/204 |
| 6,393,475 | B1 | 5/2002 | Leong et al. | 709/223 |
| 6,411,989 | B1 | 6/2002 | Anupam et al. | 709/204 |
| 6,421,678 | B2 | 7/2002 | Smiga et al. | 707/102 |
| 6,535,909 | B1 * | 3/2003 | Rust | 709/204 |
| 6,535,912 | B1 * | 3/2003 | Anupam et al. | 709/217 |
| 6,584,493 | B1 | 6/2003 | Butler | 709/204 |
| 6,675,216 | B1 * | 1/2004 | Quatrano et al. | 709/229 |
| 6,687,739 | B2 * | 2/2004 | Anupam et al. | 709/204 |
| 6,687,878 | B1 * | 2/2004 | Eintracht et al. | 715/512 |

OTHER PUBLICATIONS

Flanagan, JavaScript: the Definitive Guide, 3rd Ed., published Jun. 1998, pp. 1-5.*

* cited by examiner

BROWSER OPERATION

DETAILED CAPTURE PROCESS OPERATION

METHODS AND APPARATUS FOR OBTAINING A STATE OF A BROWSER

FIELD OF THE INVENTION

The present invention generally relates to mechanisms and techniques for capturing state information of browser software, and more particularly, to systems and techniques which capture such state information on a client computer system, and package and forward such state information to a server computer system.

BACKGROUND OF THE INVENTION

The rise in popularity of computer networks such as the Internet has led software application developers to create complex software applications which interact between computer systems over the network. One example of such a software application is a collaboration system which allows multiple Internet browsers (i.e., users controlling such browsers) referred to as participants to partake in a shared web session via a collaboration server. Generally, the collaboration server serves as a point of contact for the participant browsers and manages the shared collaboration session. When supporting one or more collaboration sessions that include multiple web browser participants, the collaboration server allows at least one participant browser to "drive" or control the shared collaboration session (e.g., one participant browser "surfs" or navigates pages served by the web server) while the other remaining participant browsers are directed to receive a copy of any content information such as web pages as they appear to the controlling participant browser. In this manner, the controlling browser can guide other participant browsers through a shared web session without requiring the other users of other participant browsers to interact with this web browser. This is only one example of collaboration of which there may be other forms.

Generally, upon initiation of a collaboration session, each participant browser identifies itself to the collaboration server and collaboration server begins a process of maintaining URL information associated with the shared web session between the participant browsers and the collaboration server. The purpose for this URL information is so that when other participants join the shared collaboration session, the collaboration server may provide those other participant browsers with the URL information related to the shared collaboration session so those participants can view pages related to that shared session. In a conventional collaboration system, the collaboration server operating in this manner is responsible for maintaining the URL information related to pages that participant browsers visit.

SUMMARY OF THE INVENTION

Conventional collaboration techniques suffer from a variety of drawbacks. In particular, in a conventional collaboration server, state information is generally limited to URL information and is collected and maintained within the collaboration server itself. This limits the amount of information that is available during the startup of a collaboration session. For instance, there may be browser state information contained within the participant computer system containing the participant browser that initiates the collaboration session which is unavailable to conventional collaboration servers at the start of such collaboration sessions. Other examples of such state information which does not exist within a conventional collaboration server at the start of a collaboration session may include any cookies within the participant browser, any time sensitive data related to a web page on display within the participant browser, or any other participant supplied information that may be of use in the collaboration session.

As an example, suppose a user of a browser on a client computer system is engaged in a web-based e-commerce session in which that user has an electronic shopping cart containing items that user has selected for purchase. Now suppose that user desires to enter into a collaborative web browsing session with an agent (i.e., a person) associated with the e-commerce web-site. Using conventional collaboration techniques, the agent may not be able to view the current contents of the shopping cart at the beginning of the collaboration session since the collaboration server does not have the necessary access to state information relating to the contents of the users shopping cart as this information may be maintained within the users browser.

In contrast, the present invention overcomes many of the limitations of conventional collaboration systems as related to capturing state and browser session information for browsers involved in a communications session. Generally, the present invention provides techniques and mechanisms which can capture the state of a client computer system including browser state information of a browser executing on such a computer system from within the client computer system itself and can make such information available to a collaboration server at the beginning of a collaboration session.

The system of the invention includes a capture process, which may be a Java applet for example, that performs on a client computer system to capture a snapshot of the state of a browser and any documents within the browser on the client computer system. The capture process can then forward this state information to server computer system for use, for example, in a collaboration system. Since the system of the invention is able to capture client browser and document state information within the client computer system before, for example, initiation of a shared collaboration session, and then is able to send this state information to a server computer system that operates, for example, as the collaboration server, the collaboration server can provide the state information to non-controlling participant browsers on other client computer systems during actual initiation of a shared collaboration session.

More specifically, the present invention provides methods, techniques and mechanisms for obtaining a state of a browser containing a document on a client computer system.

In one embodiment, the method comprises the steps of extracting, from the browser, via a capture process on the client computer system that operates in conjunction with the browser, state information associated with the browser and the document contained in the browser. The capture process may be a Java applet or Active-X control, for example, or may be a separate program from the browser. The method then stores the state information in at least one content object on the client computer system and transmits the content object from the capture process on the client computer system to a server computer system to maintain a state of the browser in the server computer system. In this manner, state information of the browser process is captured on the client computer system itself, allowing for a more accurate and up-to-date representation of the complete state of the client computer system.

In another embodiment, the step of extracting includes the steps of opening an application programming interface from the capture process to the browser process. The application programming interface provides functions to access the state information associated the browser and the document contained in the browser. The state information includes at least one of a document state and a session state associated with the browser. In such an embodiment, the method performs, via the capture process, the functions provided by the application programming interface to access and retrieve the state information on the client computer system from the browser process.

In yet another embodiment, the functions provided by the application programming interface include document access functions to access the document contained in the browser and browser access functions to access the state information associated with the browser. In this embodiment, the step of performing, via the capture process, the functions provided by the application programming interface includes the steps of accessing the document contained within the browser for document tags existing in the document using at least one of the document access functions and copying, into a document content object, the content associated with each document tag accessed from the document.

Document tags may be, for example, HTML tags, commands, constructs, script logic statements or any other identifiable and/or parsable or otherwise accessible content with a document. Furthermore, the method includes the steps of capturing, via at least one browser access function, at least one application session identifier associated with the document contained in the browser and copying the application session identifier associated with the document into the document content object. Using these techniques, the system of the invention is able to access the contents of all document(s) contained in a browser on the client computer system and is able to store such contents as state information within a content object. Such state information in the content object may include application session identifiers such as application, session or document cookies and/or URL information related to documents.

In still another embodiment, the document contained in the browser is a hypertext document and the step of accessing includes the step of calling a hypertext access function provided by the application programming interface to obtain each document tag within the document. Also in this embodiment, the step of copying includes the steps of calling a hypertext retrieval function provided by the application programming interface to obtain hypertext content associated with each document tag in the document and placing the hypertext content associated with each document tag in the document into the document content object. To this end, the capture process uses an API to access documents within the browser to access the contents of the documents in order to obtain the complete copy of the content (state information) of the document as well as other browser state information.

In another embodiment, the browser contains multiple documents, each associated with a document container, and the step of performing the functions provided by the application programming interface to access and retrieve the state information is performed on each document in each document container to access and retrieve the state information associated with each document in each document container. In this manner, the browser contains multiple documents, in frames for example, and the system of the invention is able to repetitively collect and gather the content of each document in each container (i.e. each frame).

In an alternative embodiment, the state information includes a document state and a session state associated with a browser, for each document contained in the browser. In this case, the step of storing arranges the document state and the session state associated with a browser, for each document contained in the browser, in a format within the content object, such that the content object associates each document state with a session state associated with the document for each document contained in the browser. The format may be a tree-type data structure or any other type of format that can be used to represent data, such as a linked list, array, string and so forth. In other words, the system of the invention arranges the state information associated with a document and content object data structures such that document content and other information such as URL's and/or cookies related to the document are stored in an associated manner, such as hierarchically in a tree, within the content object.

In another alternative embodiment, the step of transmitting transmits the content object from the capture process to a collaboration application in the server computer system for distribution to participant browsers. This allows the server computer system to receive the content object which contains the complete state information related to a browser process in any format that is compatible with many types of network communications systems. The server computer system can then re-create or un-format the content object, which may have been transferred as a string, for example.

In another embodiment, the method of the invention includes the steps of detecting an intent to initiate a collaboration session and obtaining the capture process and operating or otherwise performing the capture process to perform the steps of extracting, storing and transmitting such that the capture process captures the state information associated the browser and the document contained in the browser upon initiation of the collaboration session and transmits the state information to the server computer system such that the server computer system can provide the state information to other participants of the collaboration session. In this embodiment then, the browser process detects a requirement to capture state information and obtains the capture process configured according to the invention in order to properly perform the capture process of extracting, storing and transmitting the state information from the client computer system to the server computer system.

In yet another embodiment, the step of obtaining the capture process includes the steps of obtaining a version of the browser containing the document and determining if the version is a first value (e.g., Internet Explorer), and if so, obtaining a first version of the capture process from a first location, and if not, determining if the version is a second value (e.g., Netscape Navigator), and if so, obtaining a second version of the capture process from a second location. Using this method, the system of the invention can use a separate capture process that is specifically designed to properly capture the state of browser process that is produced by various manufacturers, such as Internet Explorer manufactured by Microsoft Corporation or Netscape Navigator manufactured by Netscape Communications Corporation.

In still another embodiment, the capture process is an applet stored on a server and the step of obtaining the capture process includes the step of downloading the applet from the server to the client computer system to capture state information associated the browser and the document contained in the browser.

In an alternative embodiment, in response to detecting an intent to initiate a collaboration session, the method performs the step of setting a document property of each document contained in the browser to a common value. This embodiment allows the browser process to enable an application programming interface to be able to properly read the contents of each document contained in the browser by setting one or more document properties of the documents to the common value.

In yet another alternative embodiment, the step of setting a document property of each document contained in browser to a common value includes the step of performing script logic to alter a document domain property of each document contained in the browser to a common domain.

In other method embodiments of the invention, methods are provided for performing collaboration between participant browsers. One such method embodiment comprises the steps of obtaining state information from a browser process performing on a first client computer system, from within the first client computer system and transmitting the state information from the client computer system to a server computer system. The server computer system then performs the operation of distributing the state information from the server computer system to at least one participant browser on a second client computer system to allow the participant browser on the second client computer system to re-create the state of the browser process performing on the first client computer system. This embodiment enables the participant browser on the second client computer system to enter a collaboration session with the browser process of the first client computer system at a point in the collaboration session defined by the state information.

In an alternative to the above embodiment, the steps of a obtaining, transmitting and distributing are performed prior to the initiation of the collaboration session between the browser process performing on the first client computer system and a collaboration server. Accordingly, the system of the invention allows state information, as it exists in the browser process on the first client computer system prior to user initiation of the collaboration session, to be obtained and provided to a server process which can distribute the state information to participants who formerly requested to join the collaboration session. This avoids those participants from periodically having to check to see if the collaboration session is in existence before requesting to join the collaboration session.

In an another alternative embodiment the steps of obtaining, transmitting and distributing are performed after the initiation of the collaboration session between the browser process performing on the first client computer system and a collaboration server. That is, such operations are performed to capture state information during the lifetime of an active collaboration session. In such an embodiment, the state information is interm state information that conveys a complete state of the browser process on the first client computer system as it exists during the existence of the collaboration session. This embodiment thus allows the invention to capture state information about a browser process involved in a collaboration session, such as the controlling browser process, and then allows the invention to provide this interm state information to a server computer system which can distribute the interm state information to new participant browsers which recently requested to join the already active collaboration session. These new participant browsers are thus immediately brought up-to-date with the current state of the collaboration session upon joining the collaboration session.

The invention also includes computer systems configured to perform all of the method operations in embodiments disclosed herein. Specifically, according to one embodiment of the invention, a computer system is provided that includes a memory configured with a browser containing at least one document, an input-output mechanism, a processor and an interconnection mechanism coupling the memory, the processor and the input-output mechanism. In such a computer system configuration, the memory is further configured with a capture process, that when performed on the processor, causes the processor to obtain a state of the browser containing the at least one document by performing the operations of extracting, from the browser, state information in the memory associated the browser and the at least one document contained in the browser and storing the state information in at least one content object in the memory and then transmitting the content object to a server computer system, via the input-output mechanism, to maintain a state of the browser in the server computer system.

Generally, other embodiments of the invention include a computer system configured with web browser software and a capture process as disclosed herein to perform all of the methods disclosed herein via software control, or via hardware and/or software configured to perform those methods and the techniques disclosed herein as the invention.

Other embodiments of the invention that are disclosed herein include software programs to perform the operations summarized above and disclosed in detail below. More particularly, a computer program product is disclosed which has a computer-readable medium including computer program logic encoded thereon to provide the methods for capturing the state of a browser according to this invention and its associated operations. The computer program logic, when executed on at least one processor within a computing system, causes the processor to perform the operations (e.g., the method embodiments above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the browser state capturing techniques and mechanisms of this invention typically perform (e.g., execute, run, or are otherwise operated) on client computer system coupled to a computer network.

By capturing complete state information on a client computer system, and wherein the state information may include user supplied information, the state information includes the most up-to-date possible information concerning the current state of communications as it exists within the browser process. In the context of collaboration systems, the state information may be provided by the invention back to the server computer system to allow the server computer system to distribute such state information to participant browsers, thus allowing the participant browsers to join the collaboration session at anytime, either during an existing collaboration session, or when such a collaboration session begins.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
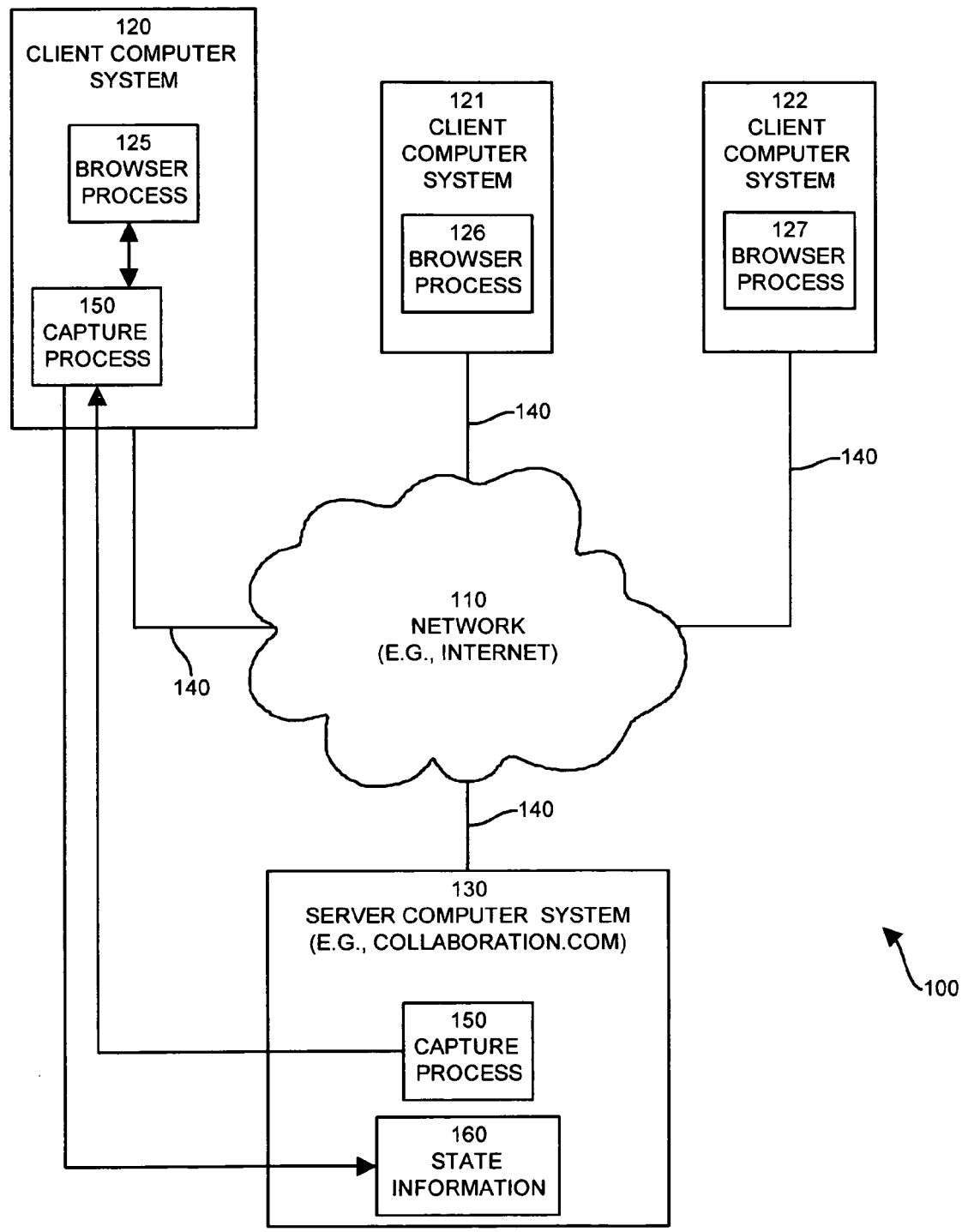
FIG. 1 illustrates a network and computing system environment that is suitable for use in describing example operations of embodiments of the invention.

The present invention provides techniques and mechanisms that capture state information related to a browser software process that contains one or more documents on a client computer system. The invention captures such state information from within the client computer system and then transmits the state information to a server computer system. Such state information can be used, for example, by collaboration servers which provide the state information to participant browsers which desire to join the collaboration session, either prior to the actual initiation of the collaboration session, or at anytime during the lifetime of an existing collaboration session. This allows, for example, a participant browser to join a pre-existing collaboration session using up-to-date state information captured from the controlling browser on a client computer system, while at the same time not requiring the participant browser to navigate through successive web pages, beginning with the initial web page of the collaboration session, in order to catch up to the most recent web page of the collaboration session.

In part, the system of the invention provides a capture process which a server can upload to a client computer system. When the client computer system performs the capture process, the capture process is able to extract, from a browser of the client computer system that contains one or more documents, state information such as document content (e.g., HTML code), user supplied state information (e.g., user supplied form field data), URLs and/or cookies associated with that browser and associated with any documents contained within the browser. The capture process can store the state information in a content object and can format and transmit the content object from the capture process on the client computer system to a process such as a "servlet" on a server computer system. This allows the server computer system to maintain a state of the browser within the server computer system.

With respect to collaboration systems, as noted above, the system of the invention allows a server configured as a collaboration server to obtain the state information related to a controlling participant browser of the collaboration session, for example, when the collaboration session is actually initiated. This state information may then be distributed to other participant browser processes to allow those participants, for example, to join a collaboration session before the session is fully initiated. As another example, by capturing state information of the browser process including any user supplied information upon the client computer systems, a server computer system can supply such state information to a new participant of a shared collaboration session that has been underway for some time, without requiring the new participant to navigate through the entire shared collaboration session web pages up to the point of the current state (i.e. the most recent web page) of the collaboration session. In other words, participants can join a collaboration session at anytime beginning on the current page of the collaboration session, without having to navigate through prior pages in order to build up the proper state of the collaboration session. This is not possible in conventional collaboration systems since a conventional collaboration server is responsible for collecting URL information concerning the controlling browser process (as opposed to a capture process in this invention) and is therefore limited in its ability to maintain accurate state information during the ongoing lifecycle of a collaboration session as that state information changes within the controlling browser process.

FIG. 1 illustrates an example of the computer network environment 100 suitable for use by the system of the invention. The environment 100 includes a server computer system 130 and client computer systems 120 through 122 coupled via data links 140 to a computer network 110, which may be the Internet, for example. Each client computer system 120 through 122 includes (e.g., executes) a respective browser process 125 through 127. The server computer system 130 includes a capture process 150 which, during the operation of the invention as will be explained, is transferred (e.g., uploaded) to the client computer system 120. Preferred embodiments of the client computer systems 120 through 122 are personal computers or workstations that can perform data communications with the server computer system 130, which is preferably operates as web server. The server computer system 130 may be configured with collaboration software to support shared collaborative communications sessions between the browser processes 125 through 127.

Examples of the browser processes 125 through 127 include the Netscape Navigator web browser software manufactured by Netscape Communications Corporation of Mountain View, Calif., and the Internet Explorer web browser software manufactured by Microsoft Corporation of Redmond, Wash. Preferably, for purposes of this invention, the most recent versions of browser processes 125 through 127 are used in order to support in fully exploit the functionality of the invention as explained herein.

According to this invention, when the capture process 150 performs on a client computer system such as client computer system 120 as in this example, the capture process 150 retrieves and captures state information 160 from the client computer system 120 and forwards the state information 160 to the server computer system 130. Such state information 160 may be useful, for example, to support a shared collaboration session between the browser processes 125 through 127.

By way of example, assume that the server computer system 130 is a collaboration server which allows users (people, not shown) to interact via respective browser processes 125 through 127 as participants to a shared collaboration session (also not specifically shown) which is served by the server computer system 130. This example server computer system 130 uses the domain name "COLLABORATION.COM" and may be reached on the network 110 via browser processes 125 through 127 referencing a hypertext link the URL "http://www.collaboration.com." Also assume that the browser process 125 is the controller of the shared collaboration session and the browser processes 126 through 127 are non-controlling participants to the shared collaboration session.

To begin the process of collaboration, a user of the browser process 125 on the client computer system 120 navigates (i.e., accesses web pages) to a collaboration initiation web page (not shown) that the server computer system 130 serves to the browser process 125. At this point the browser process 125 and the server computer system 130 have not yet entered into the shared collaboration session. The collaboration initiation page may, for example, be a web page having form fields which prompt the user of the browser process 125 for user collaboration authentication information such as a name, password, address and so forth. To establish a collaboration session and begin collaboration, the server computer system 130 must obtain the user collaboration authentication information from the collaboration initiation page in order to authenticate the user of the browser process 125 as a valid controller of the collaboration session prior to its initiation.

In this example, during the process of the user completing the collaboration initiation page (i.e., as the user enters his or her collaboration authentication information such as his or her name, password, etc.), the server computer system 130 also serves (e.g., uploads) the capture process 150 to the client computer system 120. The capture process 150 may be a Java applet embedded in the collaboration initiation page, for example, or may be any other type of process which may be uploaded and executed, interpreted, run or otherwise performed on the client computer system 120. Once the capture process 150 is loaded onto the client computer system 120 and begins to perform, the capture process 150 is able to capture the state of the browser process 125 by gathering, for example, any uniform resource locators (URLs), cookies (application and/or session cookies) and any documents (e.g., web pages, applets, scripts or other information) associated with (e.g., loaded into) the browser process 125.

The capture process 150 is also able to capture and store, as state information 160, any user supplied information within the form fields of the collaboration initiation page. The capture process 150 stores such state information 160 and transmits it back to the server computer system 130. The capture process 150 performs its processing just prior to the user's initiation of the collaboration session a point when the user attempts to submit the collaboration authentication information to the server computer system 140.

When the server computer system 130 obtains the state information 160, it can then serve the state information 160 to the browser processes 126 and 127 on the other client computer systems 121 and 122, which may have been waiting to join a shared collaboration session (i.e., browsers 126 and 127 may have previously requested to join a collaboration session, which still does not yet actually exist). That is, the state information 160 allows the browser processes 126 and 127 to establish themselves as participants to a future shared session that is in the process of being created with the server computer system 130, prior to the server computer system 130 actually receiving a request from the browser process 125 to actually establish the shared session.

Once the capture process 150 on the client computer system 120 completes transmission of the state information 160 to the server computer system 130, the browser process 125 thereafter operates as in a conventional collaboration system and proceeds to submit the user supplied collaboration initiation information (i.e., the user completed form fields) to the server computer system 130 which then establishes a shared collaboration session between the browser process 125 (as the controller of the collaboration session) and the server computer system 130. Prior to establishment of the actual collaboration session, since the server computer system 130 has already obtained the state information of the browser process 125 and has forwarded this state information 160 to the browser processes 126 and 127, the server computer system 130 can immediately join the browser processes 126 and 127 into the collaboration session without requiring further action on their part (i.e., without requiring the users of browser processes 126 and 127 to periodically attempt to join the shared session).

It is important to note here that the capture process 150 captures and transmits the state information 160 to the server computer system 130, out-of-band from and in addition to, the browser process 125 supplying user supplied collaboration initiation information in a formal request to initiate collaboration sent to a collaboration process (not shown) on the server computer system 130. As such, the collaboration server 130 receives the state information 160 conveying the state of the browser process 125 from the capture process 150, prior to receiving a request from the browser process 125 to initiate collaboration. Since the server computer system 130 then provides the browser processes 126 and 127 with this state information 160 (containing a complete snapshot of the state of the browser process 125 immediately prior to initiation of the collaboration session), the browser processes 126 and 127 can be considered participants to the shared collaboration session prior to its actual establishment.

Figure 2:
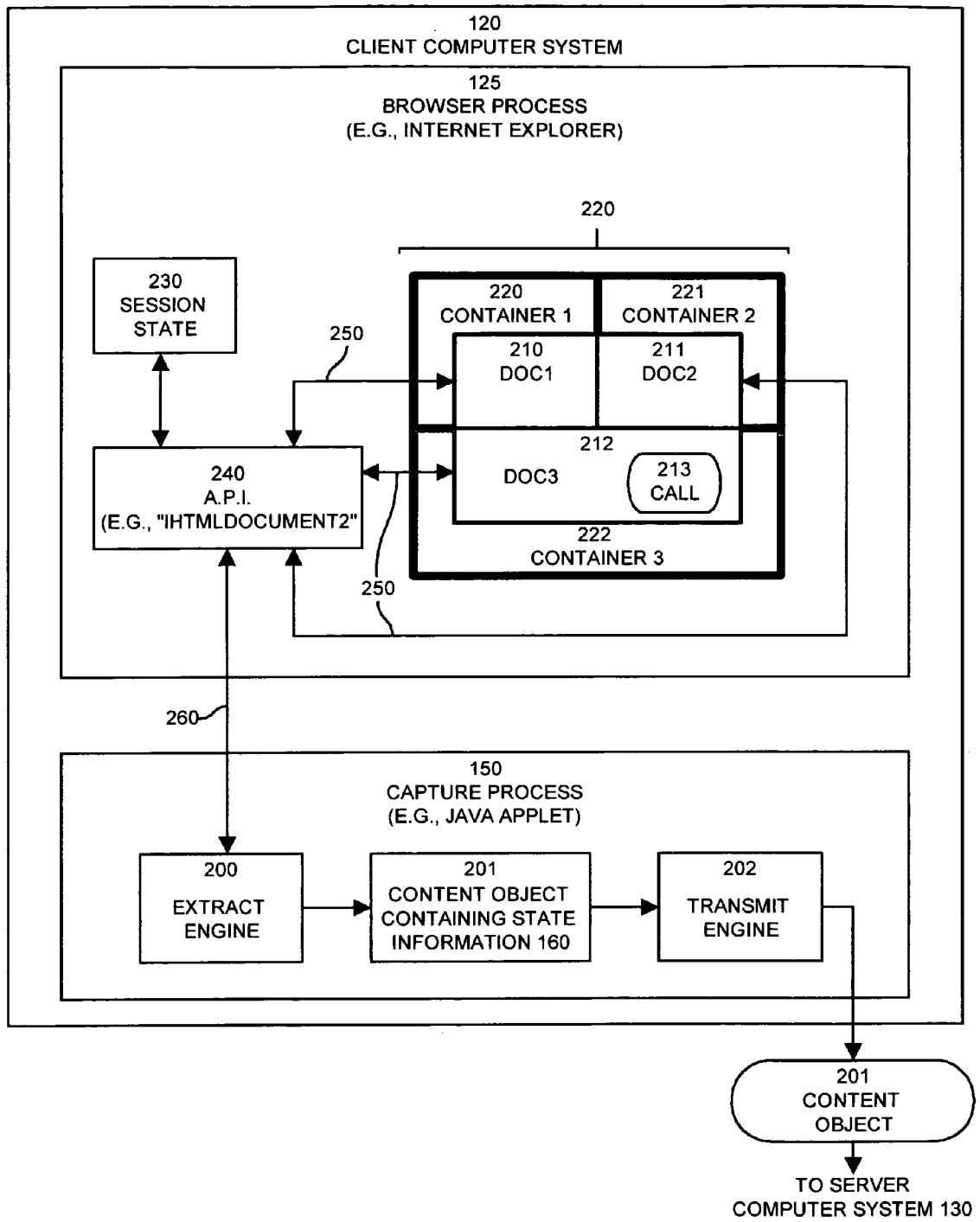
FIG. 2 illustrates a client computer system configured to perform a capture process which interacts with the browser process in accordance with embodiments of the invention.

FIG. 2 illustrates a more detailed example of the client computer system 120 configured to capture state information associated with the browser process 125. In this particular configuration, the browser process 125 includes the following components: i) a display component 220 including a plurality of containers 221 through 223 (e.g., browser frames), each of which includes (and displays to the user of the browser process 125) a respective document 210 through 212 (DOC1 through DOC3), ii) a browser and document session state 230 containing session state information, and iii) a browser application programming interface (API) 240 which can interact 250 with the display and session state components 220, 230. The client computer system 120 maintains all of the components 220, 230, and 240 in the browser process 125 as one or more software processes in a memory system (not specifically shown) within the client computer system 120.

The example client computer system 120 also contains the capture process 150 which includes an extract engine 200, a content object 201, and a transmit engine 202. As with the browser process 125, the capture process is preferably a software process that resides in a memory system in the client computer system 120. The client computer system 120 can execute, run, or otherwise perform both the browser process 125 and the capture process 150 in memory using one or more processors (also not specifically shown) within the client computer system 120. The capture process 150 can interact with the browser process 125 via an inter-process communications (IPC) channel 260. During operation, the capture process 150 obtains, gathers or otherwise captures state information 160 related to the browser process 125 as explained herein and stores this state information 160 within the content object 201. Thereafter, the capture process 150 formats and transmits this content object 201 containing the state information 160 of the browser process 125 to the server computer system 130, which can use this information, as explained above, to allow other browsers (e.g., 126, 127 in FIG. 1) to join as participants to a collaboration session that is about to begin.

Within the browser process 125, the display component 220 includes a plurality of containers 221 through 223, each of which includes a respective document 210 through 212 (DOC1 through DOC3). The containers 221 through 223 may be HTML frames, for example, which respectively display the documents 210 through 212. A typical display component 220 within a browser such as Internet Explorer or Netscape Navigator maintains containers such as 221 through 223 as a series of hierarchically related data structures. In this example, container 220 (CONTAINER 1) contains document 210 (DOC 1) and is a parent container to child containers 221 and 222 (CONTAINER 2 and CONTAINER 3) which contain respective documents 211 and 212 (DOC 2 and DOC 3). In this example, the document 212 includes a collaboration initiation button 213 labeled "CALL," the purpose of which will be explained in more detail later. Each document 210 through 212 may be a hypertext document written in a hypertext markup language (e.g., HTML, XML or the like) that includes one or more document tags such as HTML/XML statements, instructions, constructs, script logic (e.g., JavaScript) statements, commands and so forth.

The session state information 230 within the browser process 125 contains any document or application session identifiers (not specifically shown) such as document or application session cookies. The session state information 230 may also contain any session cookies related to the communications session that exists between the browser process 125 and the server computer system 130. Each document 210 through 212 (and possibly the containers 220 through 222) contained within the browser process 125 has an associated URL which uniquely identifies that document or container. The browser process 125 also maintains such URLs as part of the session state information 230. Generally then, the display component 220 of the browser process 125 maintains and displays to the user a plurality of web pages in frames represented in FIG. 2 by the documents 210 through 212 in the containers 220 through 222, and each web page and/or frame has an associated URL and may have one or more associated cookies which the browser process 125 stores in the session state 230.

The API 240 generally provides a software interface to callable functions within the browser process 125 which allows external access to the browser process 125 from other processes, such as the capture process 150. Of particular interest to this invention, the API 240 provides functions to allow external access to: i) state information associated with the browser such as cookies and/or URLs within the session state information 230 and ii) other state information such as the entire contents of the documents 210 through 212 contained within the containers 220 through 222 in the browser process 125. Generally, the term "state information" may include the contents (e.g., HTML code, script content, hypertext tags, etc.) of one or more documents contained within the browser process 125, as well as any currently displayed user supplied form field information, application or session cookies, URL information, scripts and any other browser or document content information that relates to or can convey the complete state of the browser and/or its associated documents at any point in time.

In one example embodiment, the API 240 is the "IHT-MLDOCUMENT2" API interface provided by Internet Explorer version 5.0, which as will be explained, is used by the capture process 150 configured according to this invention to gather the session state information 230 from the browser process 125, the contents/state of its containers (e.g., 220 through 222) and that contents/state of any associated documents (e.g., 210 through 212) contained therein.

According to an example operation of the configuration shown in FIG. 2, a user (not shown) interacts with the browser process 125 to load and display the various documents 210 through 212 (e.g., successively obtains web pages represented by documents 210 through 212). The purpose of this indication to select a user can obtain the web page (document 212 in this example) that allows the user to initiate collaboration session between the browser process 125 and the server computer system 130. During the process leading up to collaboration, the browser process 125 caches (i.e., in memory) and displays the various documents 210 through 212 received from the web server computer system 130. Besides the documents 210 through 212, the browser process 125 may also receive one or more identifiers which include URLs of the documents 210 through 212 and which may include one or more application or session cookies.

In this particular example, the document 212 "DOC3" is a collaboration initiation form which includes the collaboration initiation button 213 labeled "CALL." To begin the collaboration process, the user of the browser process 125 may select or "click" the collaboration initiation button 213 via his or her mouse, for example, to initiate a collaboration session between the browser process 125 and the server computer system 130.

Figure 3:
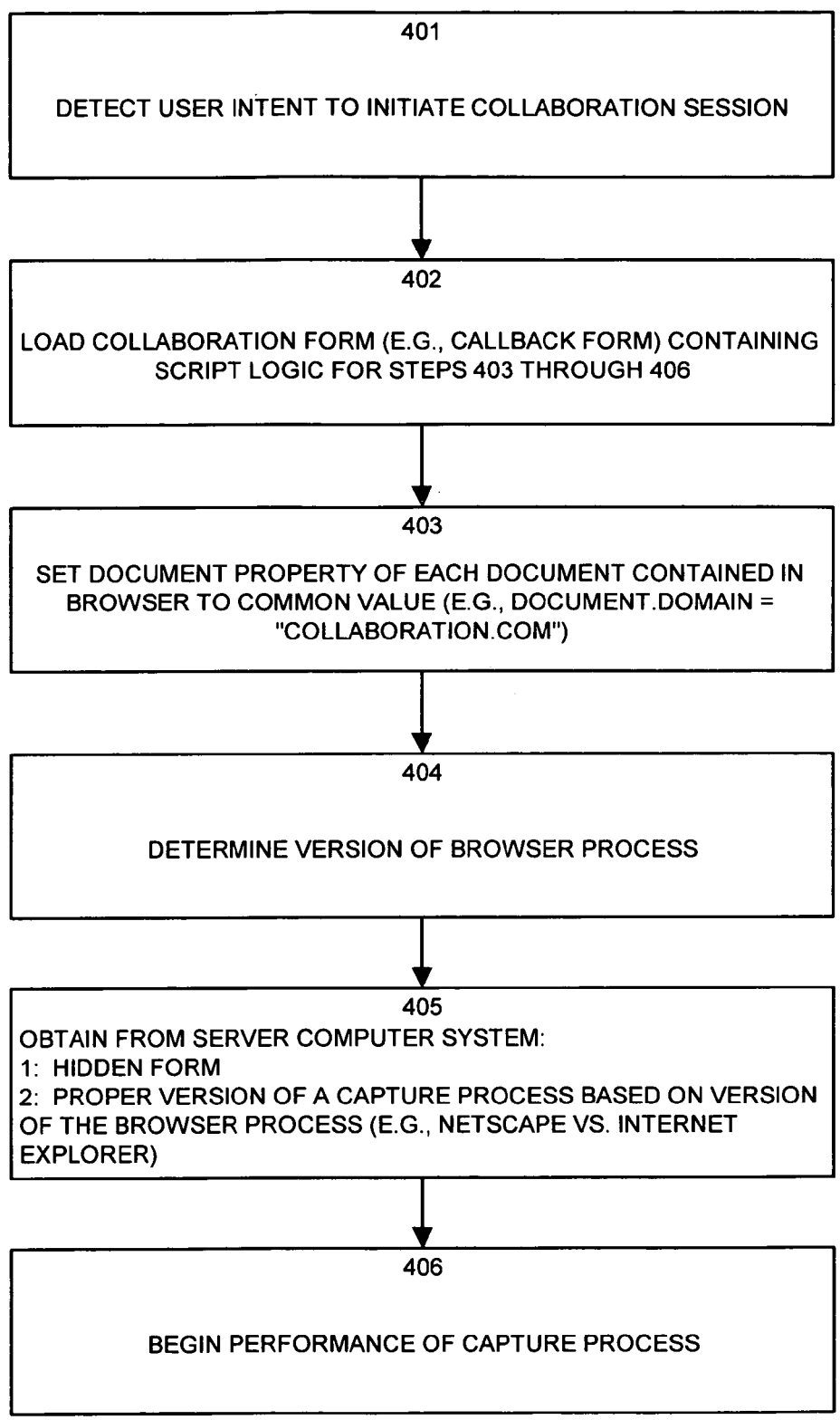
FIG. 3 is a flow chart illustrating an example of the processing steps performed by a browser within a client computer system configured in accordance with one embodiment of the invention.

FIG. 3 illustrates a flow chart of the processing steps 401 through 406 performed by the browser process 125 configured according to the invention. The processing of FIG. 3 preferably takes place within the browser process 125 at a point when the user of the browser process 125 selects or clicks the collaboration initiation button 213 in order to enter into the collaboration session with the server computer system 130. It is important to understand that, that in this example explanation, the processing steps 401 to 406 take place within the browser process 125 prior to the browser process 125 transmitting, to the server computer system 130, any user supplied collaboration authentication in a formal request to initiate collaboration. In other words, processing steps 401 through 406 preferably take place prior to the initiation of the collaboration session and more specifically, during and/or after the user has supplied any required user collaboration authentication information, as will be explained. Preferably, the processing steps 401 through 406 are embodied as script logic such as JavaScript within one or more web pages, such as within document 212.

In step 401, the browser process 125 detects a user's intent to initiate a collaboration session. In this example, this event is detected when the user selects the collaboration initiation button 213. This is not meant to be limiting, however, and another event such as the user simply visiting a collaboration web page via the browser process 125 may serve to trigger step 401.

In step 402, once the browser process 125 detects the user's intent to enter a collaboration session (preferably as the controlling participant of the collaboration session), the browser process 125 loads a callback form (i.e., another web page containing form fields, not specifically shown) that, among other content, contains script logic (e.g., JavaScript) configured according to the invention to carry out the processing steps 402 to 406.

Generally, the callback form (document 212 may also be considered a callback form for purposes herein) includes one or more form fields that prompt the user to enter collaboration authentication information such as a username and/or a password that the server computer system 130 (a collaboration server in this example) can use to authenticate that the user of the browser process 125 is allowed to create a collaboration session. Once the user enters the required collaboration authentication information on the callback form, the user can submit the user supplied collaboration authentication information, for example, buy clicking a submit button on the callback form. As an example, document 212 for a callback form, the user of browser process 125 would enter his or her collaboration authentication information and would select the call button 213 in order to submit this information to the server computer system 130.

According to this invention, before the browser process 125 actually submits the collaboration identification information entered by the user into the form fields of the callback form to the server computer system 130 (i.e., before a formal request to begin collaboration is sent from the browser process 125 to the server computer system 130), the browser process 125 continues operation according to the invention by performing script logic embedded in the callback form to carry out steps 403 through 406.

Generally, steps 403 through 406 cause the browser process 125 to configure itself to allow state information to be obtained by the capture process 150, which is then loaded and launched from the browser process 125 in step 406, as explained below.

More specifically, in step 403, the browser process 125 performs script logic to set a document property of each document 210 through 212 contained in the browser process 125 to be a common value. In one embodiment, the browser process 125 (e.g., using JavaScript embedded within the callback form to set a document property of each document 210 through 212, called "document.domain," to contain the value of the domain of the collaboration server computer system 130. In this particular example, step 403 sets the "document.domain" property of each document 210 through 212 to "COLLABORATION.COM."

Next, in step 404, the script logic in the callback form causes the browser process 125 to determine what version of the browser process 125 is currently performing (i.e., executing). As an example, the browser process 125 may be Internet Explorer version 5.0, or the user may be using Netscape Navigator version 4.0 as the browser process 125. Assume for this example that the browser process 125 is Internet Explorer version 5.0. In step 404 then, the script logic determines this fact. The script logic in the document 212 can determine the version of the browser process 125 in step 404 using known techniques, such as by calling a function within the API 240 to return the version of the browser process 124.

Once the version of the browser is known, in step 405, the browser process 125 can further perform script logic within the callback form to obtain (e.g., download), from the server computer system 130, both: i) a hidden form and ii) the proper version of the capture process 150 based upon the version of the browser process obtained in step 404 that is in use on the client computer system 120. In one embodiment, the hidden form that the browser process 125 downloads in step 405 can contain the proper version of the capture process 150 embedded within the hidden form. As will be explained further, the hidden form may be an HTML form field document that is hidden from display to the user of the browser process 125. In a preferred embodiment, the capture process 150 is a Java applet embedded within this hidden form.

The particular version of the capture process 150 which the browser process 125 downloads from the server computer system 130 in step 405 depends upon the version of the browser process 125 that is in use on the client computer system 120 (as determined in step 404). For example, if the browser process 125 in use of the client computer system 120 is Internet Explorer version 5.0, then the processing in step 405 obtains a version of the capture process 150 that is compatible with the application programming interface 240 provided by Internet Explorer version 5.0. However, if the browser process 125 that is in use on the client computer system 120 is Netscape Navigator, then the processing in step 405 obtains a different version of the capture process 150 from the server computer system 130 which is compatible within API 240 provided by Netscape Navigator. In either case, as will be explained shortly, the capture process 150 uses the hidden form that the browser process 125 also obtains in step 405 to return state information obtained from the browser process 125 on the client computer system 120 to the server computer system 130.

Once the proper version of the capture process 150 is loaded onto the client computer system 120 (step 405), in step 406, the browser process 125 performs script logic to begin the performance of, or launch, the capture process 150 (i.e., to begin execution or interpretation of the capture process applet).

Figure 4:
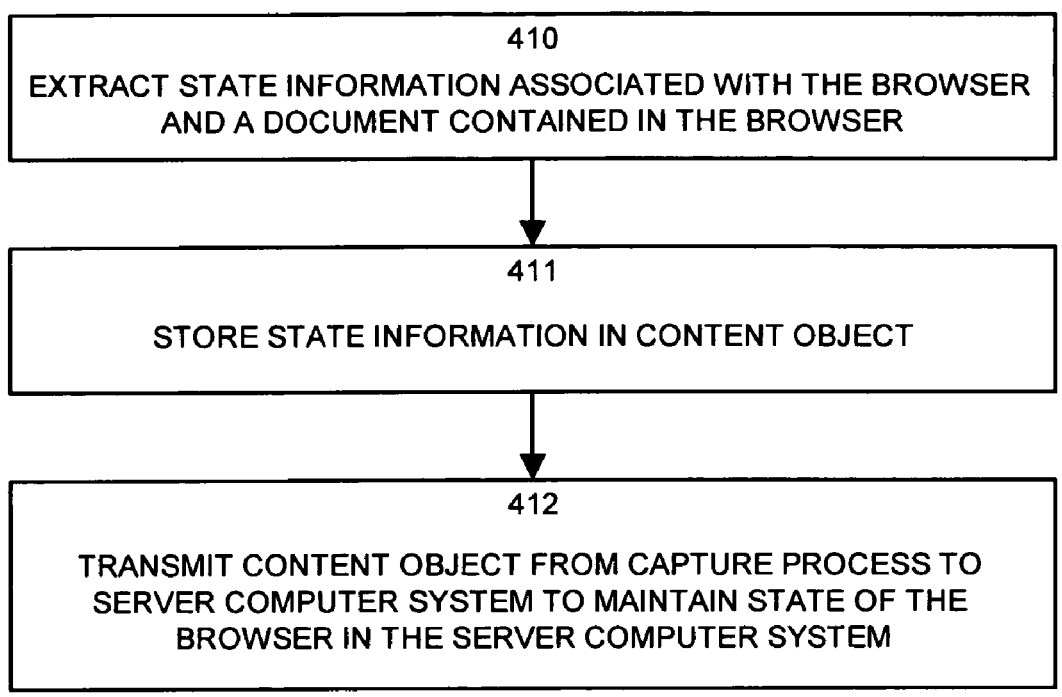
FIG. 4 is a high level flow chart of the general processing operations performed by a capture process according to one embodiment of the invention.

FIG. 4 illustrates processing steps 410 through 412 which show the general operations of the capture process 150 as it executes or otherwise performs on the client computer system 120 in accordance with embodiments of the invention.

Generally, in step 410, the capture process 150 interacts with the browser process 125 to extract state information associated with both the browser process 125 and at least one document (e.g. one or more of documents 210 through 212) contained within the browser process 125. Next, in step 411, the capture process 150 stores the state information obtained in step 410 in a content object 201. Finally, in step 412, the capture process 150 transmits the content object 201 from the capture process 150 to the server computer system 130, using the hidden form obtained by the browser process 125 in step 405, in order to maintain a state of the browser process 125 within the server computer system 130.

Figure 5:
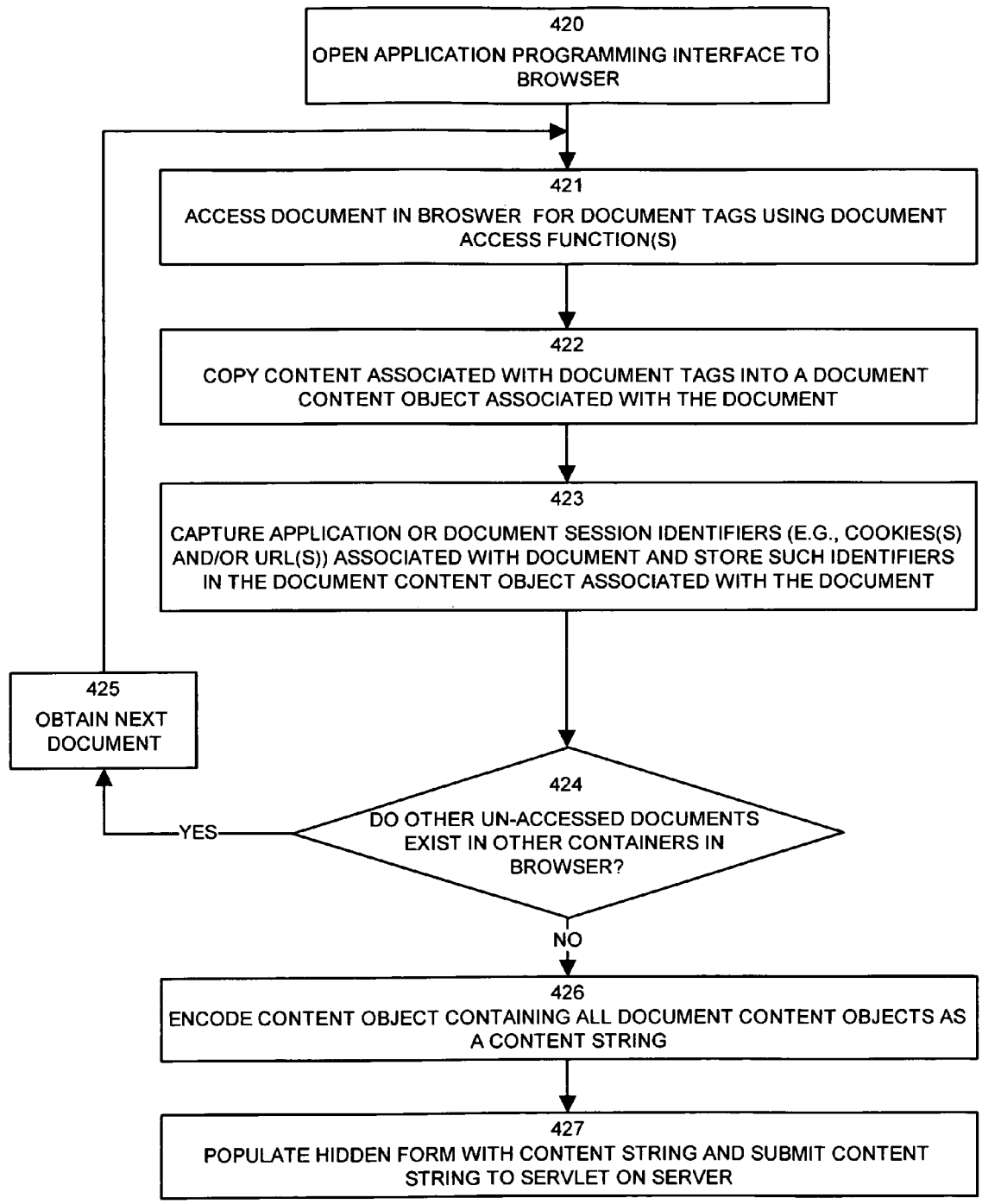
FIG. 5 is a flow chart of the processing steps showing in more detail the operation of a capture process according to one embodiment of the invention.

FIG. 5 shows a flow chart includes processing steps 420 through 427 which illustrates more details of the processing performed by the capture process 150 according to embodiments of the invention. Generally, the processing illustrated in FIG. 5 operates to access each document within the browser process 125 in order to capture state information related to the documents 210 through 212 and also captures state information related to the browser process 125 in then formats and sends this state information back to the server computer system 130.

In step 420, the capture process 150 opens the API 240 to the browser process 125 thereby opening intra-process communications channel 260 (FIG. 2) to allow the capture process 150 to call functions supported by the API 240 within the browser process 125. In the example embodiment illustrated in FIG. 2, assuming that the browser process 125 is Internet Explorer version 5.0 and the capture process 150 is a Java applet, in step 420, the capture process 150 exposes the "IHtmlDocument2" component API 240 of Internet Explorer as a "wrapper" to the Java applet capture process 150 to provide access to functions within the Internet Explorer in order to obtain browser and document state information.

Next, in steps 421 through 425, the capture process 150 begins a repetitive process of capturing and storing the entire state of each document (e.g., documents 210 through 212) contained within the browser process 125 into the content object 201.

Specifically, in step 421, the capture process 150 begins accessing a document (e.g., document 210) in the browser process 125 for document tags using document access functions provided by the API 240. To do so, the API 240 provides functions to allow the capture process 150 to access and view the contents (i.e., state) of the particular documents 210 through 212 maintained by the browser process 125.

As referred to herein, the term "document tags" refers to identifiable statements or instructions such as HTML tags contained within the documents 210 through 212 in the browser process 125. In step 421 then, to access a document, the capture process 150 uses a function such as "get HTML/tag" supported by the API 240 to sequentially obtain the various tags within a document (e.g., document 210) and can uses a function such as "get outerhtml" to obtain the remaining HTML contents, including any script logic (e.g., JavaScript) or other content or data associated with the tag obtained using the "get HTML/tag" function. Using such functions, step 421 allows the capture process 150 to access and obtain the entire HTML contents, tag by tag, for a document (e.g., one of documents 210 through 212) in the browser process 125.

Once each tag and the tag contents are obtained in this manner, the capture process 150 performs step 422 which copies the content associated with each document tag (as well as the document tags themselves) into a document content object (not shown in this figure), which is a data structure within the content object 201. That is, once the capture process 150 obtains the tags and associated HTML tag contents for a document (e.g., 210) in step 421, step 422 copies the HTML tags and associated contents into a document content object within the content object 201. As will be explained shortly, the content object 201 is a data structure of document content objects which the capture process 150 can use to store the state information of the browser process 125 such as HTML document contents, document and/or container URLs, application and/or cookies and any other state information.

Once the capture process 150 as copied the entire contents (i.e., state information) of a document (e.g. 210) into a content object, the capture process 150 performs step 423 in order to capture any application or document session identifiers (e.g. application, session, or document cookies) as well as any URLs associated with the document and then stores such identifiers in the document content object associated with that document within the content object 201. Essentially, the capture process performs step 423 to gather any other state information related to the document been processed besides the actual document content, which was obtained in steps 421 and 422. At this point, the content object 201, whose details will be explained shortly, contains an entire snapshot of the state information related to one of the documents contained in the browser process 125 as a document content object.

Next, the capture process in step 424 determines if other documents remain in the browser process 125 that have not been processed according to steps 421 to 423. If, in step 424, the capture process 150 determines that other documents remain to be processed, the capture process performs step 425 to obtain the next document within the browser process 125 in then returns to perform steps 421 to 423 on this document. As is evident from the flow of processing steps 421 to 425, the capture process 150 repeats the steps for each document contained in the browser process 125. Accordingly, after the capture process 150 is processed all documents contained within the browser process 125, the content object 201 (FIG. 2) will contain a document content object contained complete state information of all documents within the browser process 125.

Figure 6:
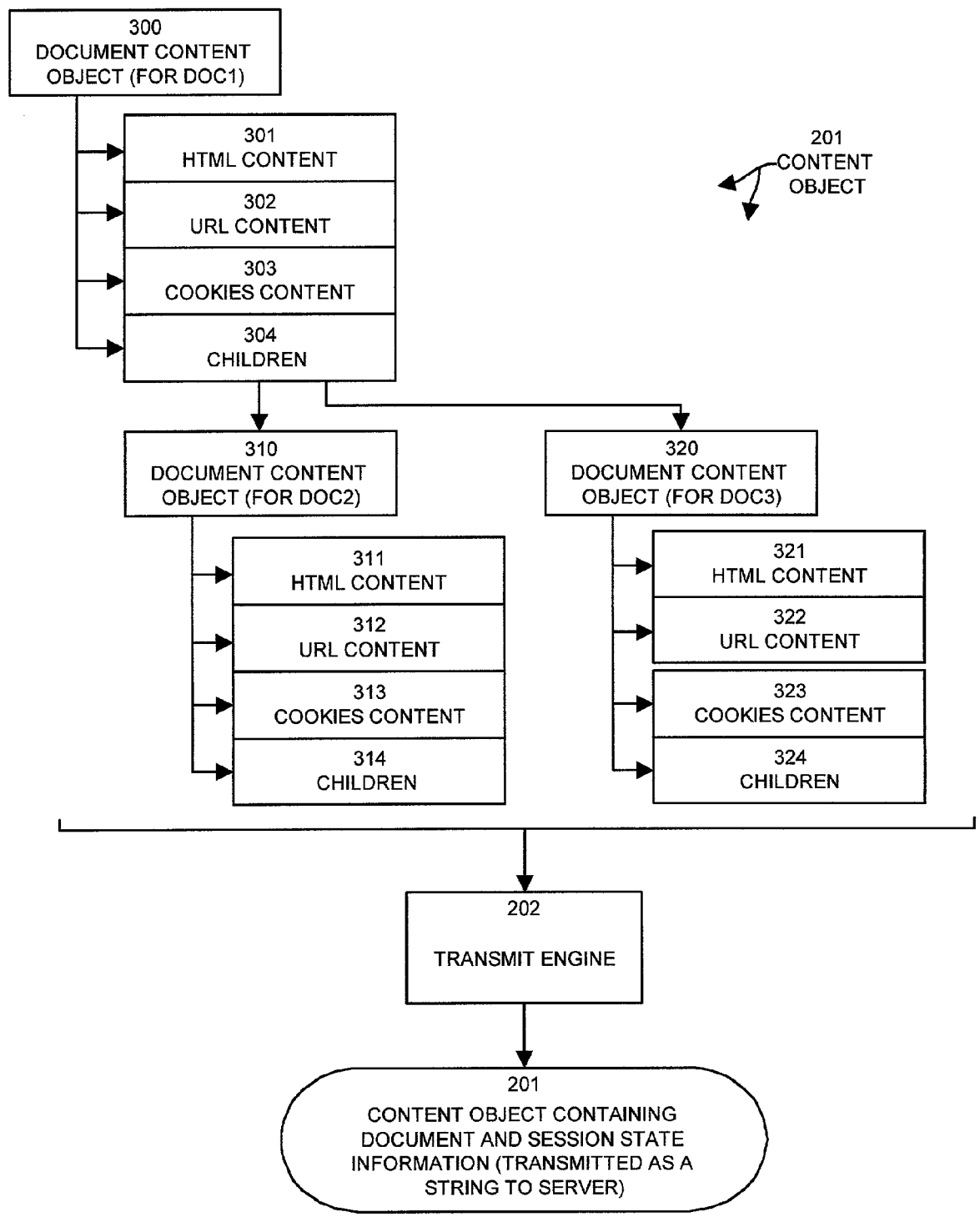
FIG. 6 illustrates an example of a content object containing document and session state information for a browser on a client computer system which gets transmitted to server computer system according to embodiments of the invention.

FIG. 6 illustrates an example architecture for a content object 201 data structure suitable for use by embodiments of the invention. As explained above, the capture process 150 creates the content object 201 illustrated in FIG. 6 during the processing of steps 421 through 425 in FIG. 5.

As illustrated, the content object 201 is arranged as a tree structure in which each document 210 through 212 in the browser process 125 has a corresponding document content object 300, 310 and 320 as a leaf node in the tree. Stemming from each document content object 300, 310, 320 are specific content objects 301 through 303, 311 through 313 and 321 through 323 which the capture process 150 uses to store various portions of state information related to the documents 210 through 212 that the capture process 150 discovers and accesses (i.e. via steps 421 through 423 in FIG. 5) in the browser process 125.

By way of example, the document content object 300 represents the various portions of state information related to document 210. For instance, the HTML content object 301 is a data structure which contains the entire set of HTML tags, statements, instructions, scripts and/or code for the document 210 which the capture process 150 obtains via steps 421 and 422 in FIG. 5. Likewise, after the capture process 150 processes step 423 in FIG. 5, the URL content object 302 will contain the URL of the document 210 and the cookies content object 303 will contain any cookies associated or related to the document 210 that the capture process 150 discovers as existing within the browser process 125.

Returning attention now to the processing steps in FIG. 5, in step 424, once the capture process 150 has processed all of the documents 210 through 212 according to steps 421 to 425, step 424 causes the capture process 150 to determine if no un-accessed documents remain in this processing proceeds to step 426.

In step 426, the capture process 150 encodes the content object 201 that contains all of the document content objects (e.g., 300 through 324 in FIG. 6) for each document 210 through 212 in the browser process 125 as a content string. In other words, the capture process 150 encodes the content object 201 which comprises a number of hierarchically related content object data structures into a single text string of information.

Next, in step 427, the capture process 150 populates the hidden form, obtained by the browser process 125 in step 405, with the content object string and submits or transmits the content object string over the network 110 (FIG. 1) to a process called a servlet (not shown) that performs on the server computer system 130. That is, in step 427, the capture process 150 transmits the content object from the capture process on the client computer system 120 to the server computer system 130 to allow the server computer system 130 to maintain the state of the browser for use by other participants that have requested to join the collaboration session which is about to be initiated.

In this manner, the system of the invention offloads majority the processing operations required to capture the state of the browser process in a client computer system. In doing so, a collaboration servers such as the server computer system 130 alleviates itself the burden of capturing such state information on its own. Instead, by providing the capture process 150 of this invention to a client computer system upon which the capture process 150 performs to capture all required state information related to the browser process, the server computer system 130 may not be concerned with handling such processing requirements. Instead, the server computer system merely awaits return of the state information 160 created as explained above. Once the server computer system 130 obtains the state information 160 which depicts the state of the browser process 125 immediately prior to the user and initiating a collaboration session, the server computer system 130 can use the state information 160 to allow other participant browsers such as browser processes 126 and 127 to join the collaboration session about to begin.

Moreover, the processing of the invention as explained above provides an extremely robust capture mechanism which can capture the state of the browser process 125. Conventional collaboration systems not equipped with the system of the invention are limited in that they are unable to capture, for instance, user or participant computer based state information. In other words, the system of the invention captures state information within the client computer system 120 during initiation of collaboration, and then forwards such browser state information to the client computer system 130 out of band, or via a separate communications message (e.g., the content object string) in addition to the standard request to initiate collaboration.

Figure 7:
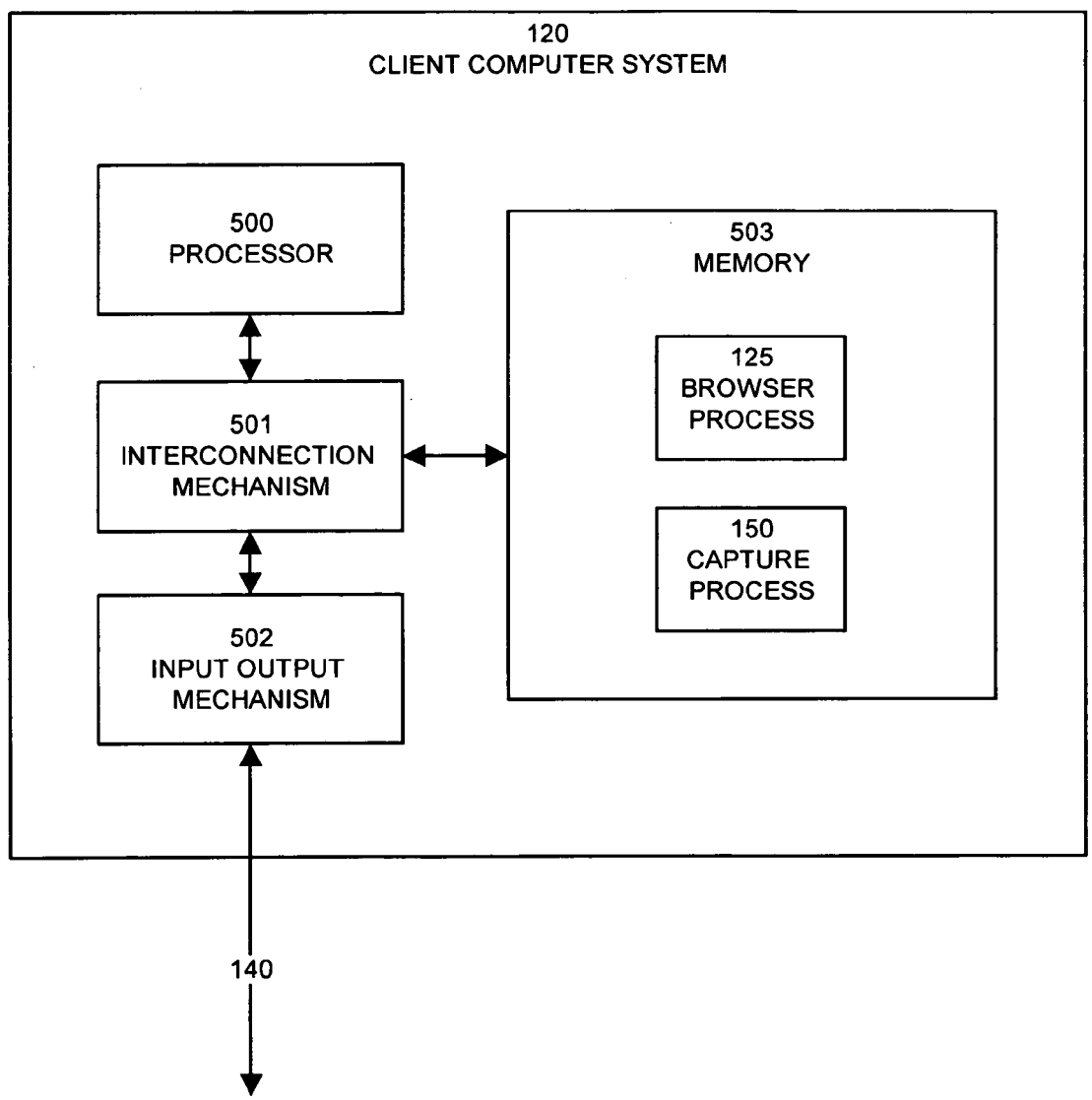
FIG. 7 illustrates an example architecture of a client computer system configured in accordance with the invention.

FIG. 7 illustrates an example architecture of the client computer system 120 configured in accordance with an embodiment of the invention. In this example embodiment, the client computer system includes a processor 500, an interconnection mechanism 501, an input output mechanism 502, and a memory system 503. The memory system 503 contains the browser process 125 and the capture process 150, as explained above. In operation, the processor 500 interacts with the memory system 503 via the interconnection mechanism 501 to perform the browser process 125 and the capture process 150 according to the techniques explained herein. The input output mechanism 502 allows the client computer system 120 to communicate, for instance, with the server computer system 130 (FIG. 1) via the data link 140 which couples the client computer system 120 to the network 110 (FIG. 1).

Those skilled in the art will understand that there can be many variations made to the operations, techniques and mechanisms explained above while still achieving the same objectives of the invention. Such variations are intended to be covered by the scope of this invention.

As an example of such a variation of the aforementioned example descriptions, it is to be understood that the capture processing of this invention may be performed periodically during the existence or lifetime of a collaboration session having multiple participants. That is, while the former example explanation explains the operation of the invention just prior to the initiation of the collaboration session, the techniques of the invention can be employed periodically during a collaboration session to capture the state of the controlling browser process 125, as the controlling browser process of the collaboration session (or for any participant browser, for that matter).

In doing so, the server computer system 130 thus can periodically receive a snapshot of the state information of a browser process 125 as the browser process controls the collaboration session. Such interm state information (where the word interm implies the state information of a browser process 125 that controls a currently existing collaboration session) is valuable, for instance, so that the server computer system 130 can supply a new participant browser to an existing collaboration session with the interm state information. This allows the new participant browser to immediately "come up to state" with the current state of the collaboration session, without having to navigate through successive former pages of the collaboration session to eventually reach the point of the current page of collaboration session.

Since the state information provided from the client computer system 120 to the server computer system 130 as explained herein contains the current state of the controlling browser of the collaboration session (including, for example, cookies, documents, URLs, and importantly, including the most up-to-date version of any user supplied information), for the controlling browser of the collaboration session, if this state information is then provided to a new participant browser of an existing collaboration session, that new participant browser is immediately brought up-to-date with all information related to the collaboration session as a currently exists.

Importantly, the present invention provides state information that may include user supplied information, such that if the user of the controlling participant browser 125 enters information into a web page of the collaboration session during the existence of an active collaboration session, and then submits such information to the collaboration server 130, the system of the invention can be triggered at that point (i.e., within the client computer system 120, immediately before such a submission) as explained above to capture the current state of that controlling browser process, including this user supplied information. At that point, the system of the invention obtains the most up-to-date state information related to the existing collaboration session which is then provided to the server computer system 130 for distribution to any new participant browsers that are awaiting the ability to join the shared collaboration session. The server computer system 130 can serve this up-to-date state information to such participant browsers to allow those new participant browsers to begin collaboration on the current web page of the collaboration session, rather than having to navigate through subsequently provided pages of the collaboration session (i.e., avoiding having to begin navigating at page one of the collaboration session) in order to navigate up to the current page.

Conventional collaboration systems not equipped with the system of the invention that allow new participant browsers to join an existing collaboration session require the new browsers begin the collaboration session at the start in which case such participant browsers must navigate through successive web page is of the collaboration session in order to begin viewing the collaboration session at the current or most recent page in use by the controlling browser. The invention saves significant amounts of time for participant browsers that desire to join a collaboration session which is already underway.

The foregoing description of embodiments of the invention are not intended to be limiting. Rather, any limitations to embodiments of the invention are presented in the following claims.

What is claimed is:

1. A method for obtaining a state of a browser containing a document on a client computer system, the method comprising the steps of:
    extracting, from the browser, via a capture process executed at the client computer system that operates in conjunction with the browser, complete state information associated with the browser and the document contained in the browser, wherein the state information includes a document state, a session state associated with the browser, and at least one of document cookies, application session cookies and communications session cookies;
    storing the complete state information in at least one content object on the client computer system;
    transmitting the at least one content object from the capture process on the client computer system to a server computer system to maintain a complete state of the browser in the server computer system;
    detecting an intent to initiate a collaboration session with a first participant browser;
    obtaining the capture process;
    operating the capture process to perform the steps of extracting, storing and transmitting such that the capture process captures the complete state information associated with the browser, including state information created before the initiation of the collaboration session related to the document contained in the browser upon initiation of the collaboration session;
    transmitting the complete state information to the server computer system such that the server computer system can provide the complete state information to other participants of the collaboration session, and wherein, in response to detecting the intent to initiate a collaboration session, the method performs the step of setting a document domain property of each document contained in the browser to a common value.

2. The method of claim 1 wherein the step of extracting includes the steps of:
    opening an application programming interface from the capture process to the browser, the application programming interface providing functions to access the state information associated the browser and the document contained in the browser; and
    performing, via the capture process, the functions provided by the application programming interface to access and retrieve the state information on the client computer system.

3. The method of claim 2 wherein:
    the functions provided by the application programming interface include document access functions to access the document contained in the browser and browser access functions to access the state information associated with the browser; and
    wherein the step of performing, via the capture process, the functions provided by the application programming interface includes the steps of:
        accessing the document contained within the browser for document tags existing in the document using at least one of the document access functions;
        copying, into a document content object, the content associated with each document tag accessed from the document;
        capturing, via at least one browser access function, at least one application session identifier associated with the document contained in the browser; and
        copying the at least one application session identifier associated with the document into the document content object.

4. The method of claim 3 wherein:
    the document contained in the browser is a hypertext document;
    wherein the step of accessing includes the step of calling a hypertext access function provided by the application programming interface to obtain each document tag within document; and
    wherein the step of copying into a document content object includes the steps of:
        calling a hypertext retrieval function provided by the application programming interface to obtain hypertext content associated with each document tag in the document; and
        placing the hypertext content associated with each document tag in the document into the document content object.

5. The method of claim 2 wherein the browser contains multiple documents, each associated with a document container, and wherein the step of performing the functions provided by the application programming interface to access and retrieve the state information is performed on each document in each document container to access and retrieve the state information associated with each document in each document container.

6. The method of claim 1 wherein:
    the state information includes a document state and a session state associated with a browser, for each document contained in the browser; and
    wherein the step of storing arranges the document state and the session state associated with a browser, for each document contained in the browser, in a format within the at least one content object, such that the at least one content object associates each document state with a session state associated with a document for each document contained in the browser.

7. The method of claim 1 wherein the step of transmitting transmits the at least one content object from the capture process to a collaboration application performing on the server computer system for distribution to participant browsers.

8. The method of claim 1 wherein the step of obtaining the capture process includes the steps of:
    obtaining a version of the browser containing the document; and
    determining if the version is a first value, and if so, obtaining a first version of the capture process from a first location, and if not, determining if the version is a second value, and if so, obtaining a second version of the capture process from a second location.

9. The method of claim 1 wherein the capture process is an applet stored on a server and wherein the step of obtaining the capture process includes the step of downloading the applet from the server to the client computer system to capture state information associated the browser and the document contained in the browser.

10. The method of claim 1 wherein the step of setting a document property of each document contained in browser to a common value includes the step of performing script logic to alter a document domain property of each document contained in the browser to a common domain.

11. The method of claim 1 wherein said state information further includes other state information related to the document besides actual document content.

12. The method of claim 1 wherein said state information further includes time sensitive information related to a web page on display within the browser, and participant supplied information used in said collaboration session.

13. A computer system comprising:
a memory configured with a browser containing at least one document;
an input-output mechanism;
a processor; and
an interconnection mechanism coupling the memory, the processor and the input-output mechanism;
wherein the memory is further configured with a capture process, that when performed on the processor, causes the processor to obtain a complete state of the browser containing the at least one document by performing the operations of:
extracting, from the browser, complete state information wherein the complete state information includes a document state, a session state associated with the browser, and at least one of document cookies, application session cookies and communications session cookies;
storing the state information in at least one content object in the memory;
transmitting the at least one content object to a server computer system, via the input-output mechanism, to maintain a complete state of the browser in the server computer system;
detecting an intent to initiate a collaboration session with a first participant browser;
obtaining the capture process; and
operating the capture process to perform the steps of extracting, storing and transmitting such that the capture process captures the complete state information associated with the browser, including state information created before the initiation of the collaboration session related to the document contained in the browser upon initiation of the collaboration session; and
transmitting the complete state information to the server computer system such that the server computer system can provide the complete state information to other participants of the collaboration session, and wherein, in response to detecting the intent to initiate a collaboration session, the method performs the step of setting a document domain property of each document contained in the browser to a common value.

14. The computer system of claim 13 wherein when the processor performs the operation of extracting, the processor performs the operations of:
opening an application programming interface from the capture process to the browser, the application programming interface providing functions that can be performed by the capture process, under control of the processor, to access the state information associated the browser and the document contained in the browser; and
performing the functions provided by the application programming interface to access and retrieve the state information.

15. The computer system of claim 14 wherein:
the functions provided by the application programming interface include document access functions to access the document contained in the browser and browser access functions to access the state information associated with the browser; and
wherein, when the capture process is performed on the processor to perform the functions provided by the application programming interface, the capture process further causes the processor to perform the operations of:
accessing the document contained within the browser in the memory for document tags existing in the document using at least one of the document access functions;
copying, into a document content object in the memory, the content associated with each document tag accessed from the document; and
capturing, via at least one browser access function, at least one application session identifier associated with the document contained in the browser; and
copying the at least application session identifier associated with the document into the document content object.

16. The computer system of claim 15 wherein:
the document contained in the browser in memory is a hypertext document;
wherein the operation of accessing, when performed by the capture process on the processor, further causes the processor to perform the operation of calling a hypertext access function provided by the application programming interface to obtain each document tag within document; and
wherein the operation of copying into a document content object, when performed by the capture process performing on the processor, further causes the processor to perform the operations of:
calling a hypertext retrieval function provided by the application programming interface to obtain hypertext content associated with each document tag in the document in the memory; and
placing the hypertext content associated with each document tag in the document into the document content object in the memory.

17. The computer system of claim 14 wherein:
the browser contains multiple documents in the memory, each document associated with a document container in memory; and
wherein the processor performs the operation of performing, via the capture process, the functions provided by the application programming interface to access and retrieve the state information on each document in each document container in the memory to access and retrieve the state information associated with each document in each document container in the memory.

18. The computer system of claim 13 wherein:
the state information includes a document state and a session state associated with a browser, for each document contained in the browser in the memory; and
wherein when the processor performs the operation of storing, the processor arranges the document state and the session state associated with a browser, for each document contained in the browser, in a format within the at least one content object in the memory, such that the at least one content object associates each document state with a session state associated with a document for each document contained in the browser.

19. The computer system of claim 13 wherein when the processor performs the operation of transmitting, the processor transmits the at least one content object from the input-output mechanism to a collaboration application performing on the server computer system for distribution to participant browsers.

20. The computer system of claim 13 wherein when the processor performs the operation of obtaining the capture process, the processor performs the operations of:
   obtaining a version of the browser containing the document; and
   determining if the version is a first value, and if so, obtaining a first version of the capture process from a first location, and if not, determining if the version is a second value, and if so, obtaining a second version of the capture process from a second location.

21. The computer system of claim 13, wherein, in response to detecting an intent to initiate a collaboration session, the processor performs the operation of setting a document property of each document contained in the browser in the memory to a common value.

22. The computer system of claim 13 wherein said state information further includes other state information related to the document besides actual document content.

23. The computer system of claim 13 wherein said state information further includes time sensitive information related to a web page on display within the browser, and participant supplied information used in said collaboration session.

24. A computer program product having a computer-readable medium including capture process computer program logic encoded thereon for obtaining a complete state of a browser containing a document on a client computer system, such that the computer program logic, when performed on at least one processor within a computer system, causes the at least one processor to perform the operations of:
   extracting, from the browser, complete state information associated the browser and the document contained in the browser, wherein the complete state information includes a document state, a session state associated with the browser, and at least one of document cookies, application session cookies and communications session cookies;
   storing the complete state information in at least one content object on the client computer system;
   transmitting the at least one content object from the client computer system to a server computer system to maintain a complete state of the browser in the server computer system;
   detecting an intent to initiate a collaboration session with a first participant browser;
   obtaining the capture process; and
   operating the capture process to perform the steps of extracting, storing and transmitting such that the capture process captures the complete state information associated with the browser, including state information created before the initiation of the collaboration session related to the document contained in the browser upon initiation of the collaboration session; and
   transmitting the complete state information to the server computer system such that the server computer system can provide the complete state information to other participants of the collaboration session, and wherein, in response to detecting the intent to initiate a collaboration session, the method performs the step of setting a document domain property of each document contained in the browser to a common value.

25. The computer program product of claim 24 wherein the computer program logic that causes the processor to perform the operation of extracting further causes the processor to perform the operations of:
   opening an application programming interface from the capture process to the browser, the application programming interface providing functions to access the state information associated the browser and the document contained in the browser; and
   performing the functions provided by the application programming interface to access and retrieve the state information on the client computer system.

26. The computer program product of claim 24 wherein the capture process computer program logic is an applet that can be served by the server computer system to the client computer system and that can be performed on the client computer system to capture state information related to the browser on the client computer system.

27. The computer program product of claim 24 wherein said state information further includes other state information related to the document besides actual document content.

28. A method for performing collaboration between participant browsers, the method comprising the steps of:
   obtaining complete state information from a browser process performing on a first client computer system, from within the first client computer system, wherein the complete state information includes a document state, a session state associated with the browser, and at least one of document cookies, application session cookies and communications session cookies and state information created before the initiation of the collaboration session related to;
   transmitting the complete state information from the client computer system to a server computer system;
   distributing the complete state information from the server computer system to at least one participant browser on a second client computer system to allow the participant browser on the second client computer system to re-create the state of the browser process performing on the first client computer system and to enable the participant browser on the second client computer system to enter a collaboration session with the browser process of the first client computer system at a point in the collaboration session defined by the complete state information, wherein a document domain property of each document contained in the browser is set to a common value.

29. The method of claim 28 wherein the steps of obtaining, transmitting and distributing are performed prior to the initiation of the collaboration session between the browser process performing on the first client computer system and a collaboration server.

30. The method of claim 28 wherein:
   the steps of obtaining, transmitting and distributing are performed after the initiation of the collaboration session between the browser process performing on the first client computer system and a collaboration server; and
   wherein the state information is interim state information that conveys a complete state of the browser process on the first client computer system as it exists during the existence of the collaboration session.

31. The method of claim 28 wherein said state information further includes other state information related to the document besides actual document content.

* * * * *